United States Patent [19]

Lukas

[11] Patent Number: 4,812,007
[45] Date of Patent: Mar. 14, 1989

[54] OPTICAL FIBER CONNECTOR

[75] Inventor: Helmut H. Lukas, Ontario, Canada

[73] Assignee: Northern Telecom Limited, Montreal, Canada

[21] Appl. No.: 130,253

[22] Filed: Dec. 7, 1987

[51] Int. Cl.⁴ .............................................. G02B 6/38
[52] U.S. Cl. ................................................ 350/96.21
[58] Field of Search ............... 350/96.20, 96.21, 96.22; 439/275

[56] References Cited

U.S. PATENT DOCUMENTS

| | | | |
|---|---|---|---|
| 3,133,777 | 5/1964 | Anhalt | 339/91 |
| 3,922,064 | 11/1975 | Clark et al. | 350/96.22 |
| 4,150,866 | 4/1979 | Snyder, Jr. et al. | 439/275 |
| 4,178,068 | 12/1979 | Hoover | 350/96.22 X |
| 4,200,350 | 4/1980 | Zimmerman | 339/91 |
| 4,445,753 | 5/1984 | Collignon | 350/96.20 X |
| 4,714,317 | 12/1987 | Szenteri | 350/96.21 |

Primary Examiner—John D. Lee
Assistant Examiner—Phan T. Heartnet
Attorney, Agent, or Firm—C. W. Junkin

[57] ABSTRACT

In an optical fiber connector having a snap lock latching arrangement, internal springs act between housings and fiber holding inserts to bias the fiber holding inserts axially together into an alignment sleeve and to bias the housings axially apart to a stop position at which latching formations on the housings abut axially together. The biasing arrangement inhibits relative axial movement of the inserts and housings which would result in variable insertion loss at the connection. Stop formations provided on one of the housings center the housings with respect to one another to facilitate disengagement of the snap lock engagement.

12 Claims, 3 Drawing Sheets

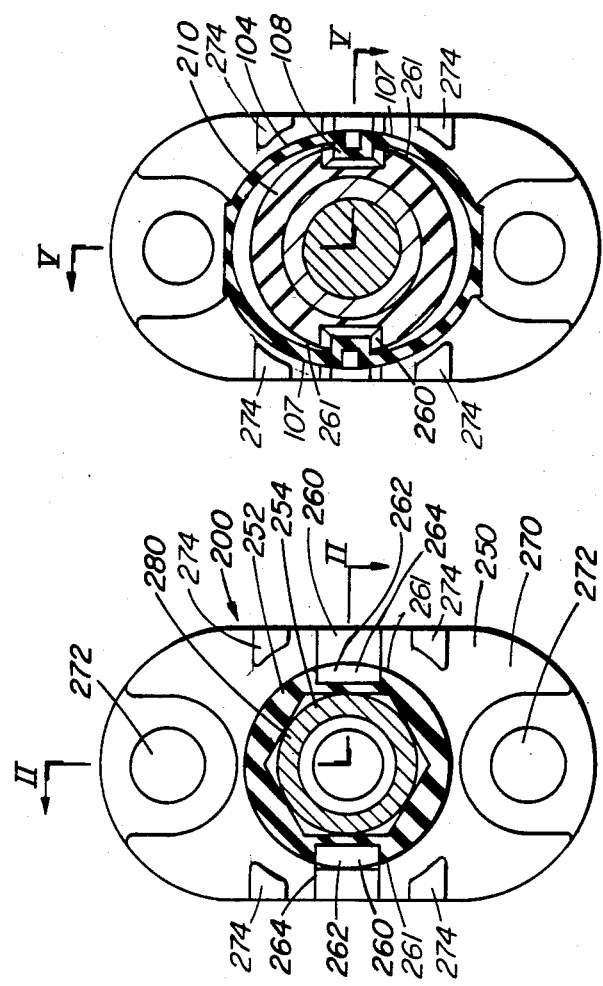
FIG. 6
FIG. 4
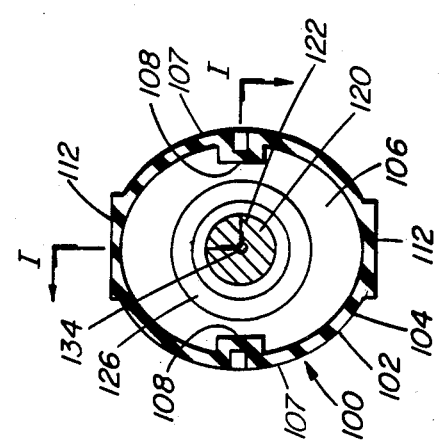
FIG. 3

OPTICAL FIBER CONNECTOR

The present invention relates to fiber optic connectors.

In a known form of detachable coupling used for electrical connectors, a rigid cylindrical male part is receivable within a resiliently deformable tubular female part of oval cross-section. The male part includes two diametrically opposite, radially outwardly extending latching projections, each projection having an inclined forward camming face and a rearward latching face. The female part includes two internal latching recesses opposite one another on the minor axis of the oval cross-section for receiving the latching projections to latch the male part to the female part.

In use of the coupling, the male part is urged axially into the female part with the latching projections of the male part aligned with the minor axis of the female part. The camming faces of the latching projections deform the female part outward as the male part is inserted into the female part, lengthening the minor axis and shortening the major axis of the oval cross-section, until the latching projections enter the latching recesses permitting the female part to snap back to its undeformed shape to capture the latching projections in the latching recesses, thereby latching the male part to the female part.

To unlatch the male part from the female part, the female part is compressed along the major axis of its oval cross-section to shorten the major axis and lengthen the minor axis, thereby moving the latching recesses outwardly to clear the latching projections and permit withdrawal of the male part from the female part.

A detachable coupling as described above is shown in U.S. Pat. No. 3,133,777 issued to J. W. Anhalt on May 19, 1964. Similar detachable couplings are shown in U.S. Pat. Nos. 4,150,866 issued Apr. 24, 1979 to C. W. Snyder, Jr. et al and 4,200,350 issued Apr. 29, 1980 to J. A. Zimmerman.

In detachable couplings as described above, the latching projections must be slightly smaller than the latching recesses to permit reliable snap action of the projections into the recesses to latch the male and female parts together and to permit easy disengagement of the projections from the recesses to unlatch the male and female parts. As a result, the latching projections are able to move slightly in an axial direction within the latching recesses in the mated condition of the coupling. Such slight axial movement of the projections within the recesses is accompanied by slight axial movement of the male part with respect to the female part. This movement is acceptable in electrical connectors in which electrical contacts of the male part make sliding contact with electrical contacts of the female part over an axially extending contact region. However, such axial movement is not acceptable in fiber optic connectors in which axial movement of one fiber with respect to the other fiber will affect the insertion loss of the connector.

The detachable couplings described above include a male contact assembly carried by the female part and a female contact assembly carried by the male part. When the male part is inserted within the female part, the male contact assembly fits tightly within the female contact assembly. The tight fit of the male contact assembly within the female contact assembly ensures that the female part remains centered on the male part during the unlatching operation so that both latching projections disengage from their respective latching recesses simultaneously to permit withdrawal of the male part from the female part. However, in fiber optic connectors of the biconical type, fiber carrying inserts in the male and female connect parts must be permitted to float, so that no equivalent centering action is provided to ensure that both latching projections disengage from their respective latching recesses during the unlatching operation. Frequently only one latching projection disengages from its latching recess, the other latching projection remaining in its latching recess to prevent withdrawal of the male part from the female part.

The present invention seeks to provide a detachable coupling which is more suitable for optical fiber connectors than those described above.

According to the present invention, there is provided an optical fiber connector, comprising: a female member having a continuous wall defining a chamber open at one end of the female member, the connector having a first latching formation on the wall, the first latching formation being accessible from within the chamber, and the wall being resiliently deformable such that inward deformation of the wall at opposed locations spaced angularly in opposite directions from the first latching formation causes outward deformation of the wall at the first latching formation to move the first latching formation outwardly; a male member for assembly to the female member by insertion axially into the open end of the chamber, the connector having a second latching formation, said second latching formation provided on the male member for engagement with the first latching formation to latch the male member to the female member, the male member being spaced inwardly of the wall at said opposed locations when latched within the chamber to permit inward deformation of the wall at said locations sufficient to disengage the first latching formation from the second latching formation by outward movement of the first latching formation; a first fiber holding means of the connector within the female member for holding an end portion of a first optical fiber to extend axially along the female member, and a second fiber holding means of the connector within the male member for holding an end portion of a second optical fiber to extend axially along the male member such that assembly of the male member to the female member axially aligns the first and second optical fibers, at least one of the fiber holding means being axially movably mounted to its respective member; and resilient biasing means operable between said one of the fiber holding means and its respective member when the male members are latched together to urge the first and second fiber holding means axially together and to urge the male and female members axially apart to a stop position at which the latching formations abut axially together.

The resilient biasing means locates the first latching formation with respect to the second latching formation when the male member is latched to the female member, and urges the fiber holding means axially together to inhibit axial movement of one fiber with respect to the other. Consequently variations in the insertion loss at the connection are reduced or avoided.

Preferably, the wall has two opposed first latching formations and the male member has two opposed second latching formations, each engageable with a respective one of the first latching formations to latch the male member to the female member. Each first latching formation is movable outwardly by inward deformation of the wall to disengage the first latching formations from the second latching formations. Conveniently, the wall may be generally oval in a section normal to a longitudinal axis of the female member, with the first latching formations being provided on a minor axis of the wall.

The latching formations may comprise complementary projections and recesses, each projection having an inclined camming surface which faces forwardly as the male member is inserted into the female member for camming the wall outwardly upon insertion to permit movement of the male member along the chamber until the projection enters its associated recess, and a rearwardly facing engaging surface for engaging an edge of the recess when the projection is in the recess to prevent withdrawal of the male member from the chamber. The male and female members may be provided with complementary axially extending ribs and channels to ensure alignment of the latching formations when the male member is inserted into the female member. The fiber holding means may be provided with complementary surfaces which mate to guide the fiber holding means into axial alignment when the fiber holding means are urged axially together.

In a preferred embodiment, the wall of the female member has a first wall portion which carries the first latching formation and a second wall portion opposite the first wall portion. The male member has a first side which carries the second latching formation and a second side opposite the first side. The male member also has a lateral extension carrying a stop formation spaced laterally of the second side of the male member. When the male member is fitted to the female member, the first wall portion of the female member is adjacent to the first side of the male member and the second wall portion of the female member fits between the second side of the male member and the stop formation. The stop formation limits lateral movement of the second wall portion when the wall is compressed so that further compression forces the first wall portion away from the first side to disengage the first latching formation from the second latching formation.

If both first and second wall portions of the female member are provided with first latching formations and both first and second sides of the male member are provided with second latching formations, the lateral extension is provided with first and second stop formations spaced laterally of the first and second sides respectively. Each wall portion fits between a respective side and stop formation when the male member is fitted to the female member. The stop formations act to center the female member on the male member during the unlatching operation to ensure that both first latching formations disengage from their respective second latching formations. Each stop formation may be a pair of stop projections spaced apart atop a respective side of the male member.

An embodiment of the invention will now be described, by way of example only, with reference to the accompanying drawings, in which:

FIG. 3 is a cross-sectional view of the female part of FIG. 1, taken on section line III—III in FIG. 1;

FIG. 4 is a cross-sectional view of the male part of FIG. 2, taken on section line IV—IV in FIG. 2;

FIG. 6 is a cross-sectional view of the mated male and female parts, taken on section line VI—VI of FIG. 5.

Figures 1, 2:
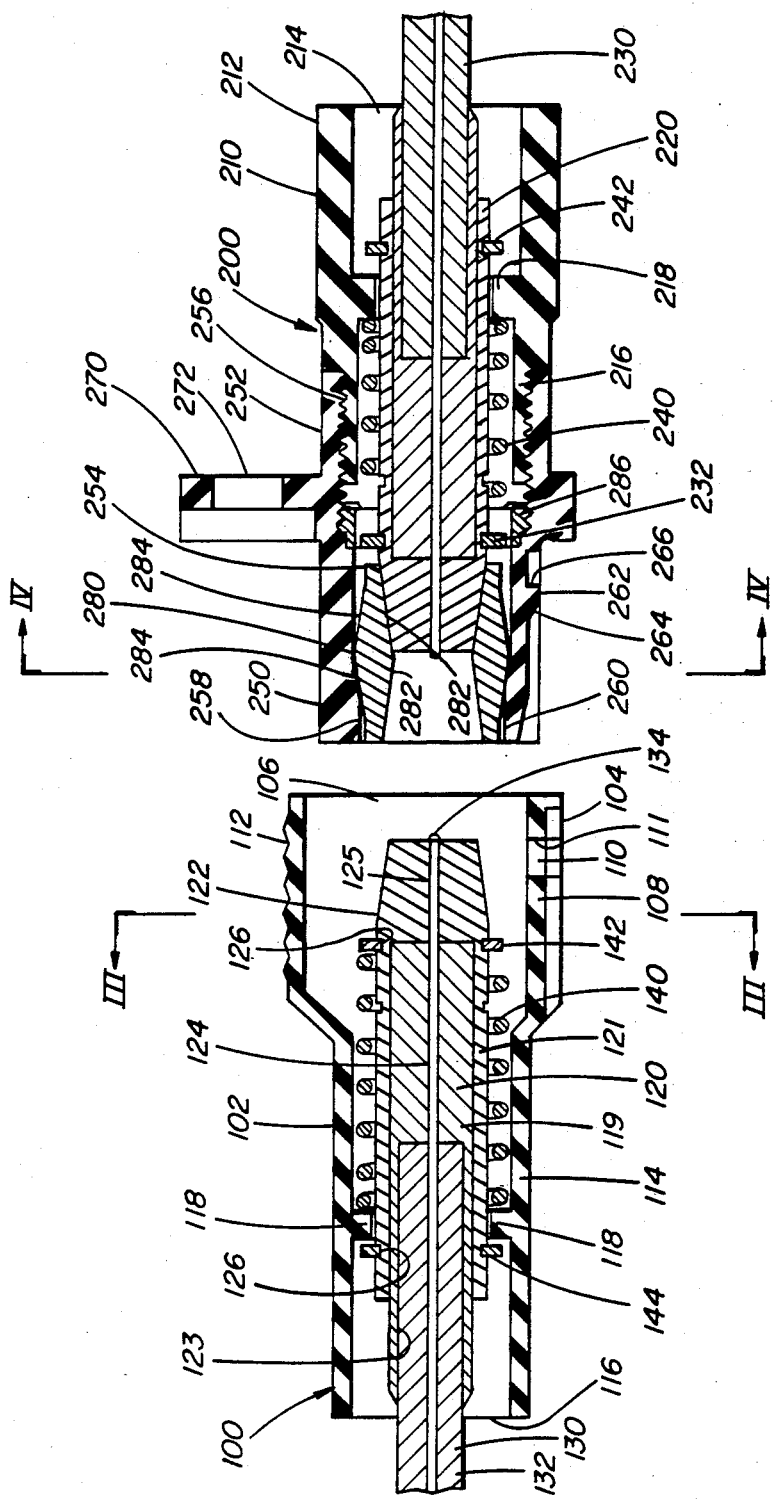
FIG. 1 is a cross-sectional view of a female part of a fiber optic connector, the cross-section taken on section line I—I in FIG. 3.
FIG. 2 is a cross-sectional view of a male part of a fiber optic connector, the cross-section taken on section line II—II in FIG. 4.

Referring to FIGS. 1 and 3, a female connector part 100 comprises a female member in the form of a molded plastic housing 102. The housing 102 has a continuous, resiliently deformable wall 104 at a forward end of the housing. This wall, 104, when undeformed, is generally oval in a section normal to a longitudinal axis of the housing 102, and defines a chamber 106 open at a forward end of the wall 104. The wall 104 has opposed wall portions 107, each of which carries a rib 108 at a respective position on a minor axis of the oval section, each rib extending axially of the housing 102 and projecting inwardly into the chamber 106. Each rib 108 has a latching formation in the form of a recess 110 opening inwardly into the chamber 106 at a position spaced axially of the forward end of the wall 104. The wall 104 has a pair of corrugated gripping surfaces 112 facing outwardly of the housing at opposed positions on a major axis of the oval section of the wall, i.e. at opposed positions spaced angularly in opposite directions from each of the recesses 110. Inward deformation of the wall 104 at the gripping surfaces 112 causes outward deformation of the wall at the ribs 108 and recesses 110.

The housing 102 has a tubular section 114 of circular cross-section extending rearward of the wall 104. The tubular section 114 has a bore 116 which is open at a rearward end of the sleeve 102, and which communicates with the chamber 106 defined by the wall 104. The tubular section has an annular rib 118 projecting inwardly into the bore 116.

The female connector part further comprises a fiber holding means in the form of a cylindrical insert 120. The insert 120 comprises a hollow aluminum cylindrical core 119 and a plastic shell 121 moulded onto the core. The plastic shell 121 has a conically tapered section 122 at a forward end of the insert and the aluminum core 119 has a stepped axial bore 124 having a bore portion 123 sized to receive a fiber optic cable jacket at a rearward end part of the insert and a smaller bore portion 125 sized to receive an optical fiber at the forward end part of the insert. The insert 120 also has a pair of external annular grooves 126, one adjacent each end of the insert.

A fiber optic cable 130 is assembled to the insert 120, by removing a section of cable jacket 132 from one end of the cable to expose an optical fiber 134 and inserting the cable end axially into the stepped bore 124 until the optical fiber protrudes axially from the forward end of the insert.

The fiber cable 130 is fixed to the insert 120 with epoxy adhesive and/or by crimping the aluminum core 119 onto the cable jacket 132, and the fiber 134 is precisely cleaved at the forward end of the insert 120. Note that it is advantageous to precision grind the conical taper 122 on the plastic shell 121 after the fiber 134 has been fixed in the insert while optically monitoring the position and orientation of the fiber to ensure that the conical taper and the fiber are coaxial.

The insert 120 is assembled to the housing 102 by passing the insert through the bore 116 and chamber 106, placing resilient biasing means in the form of a helical spring 140 over the insert, securing a c-clip 142 in a forwardmost of the annular grooves 126 to retain the spring, and securing a c-clip 144 in a rearwardmost of the annular grooves 126 to retain the insert in the housing. When assembled as described, the spring 140 acts between the annular rib 118 and the c-clip 142 to bias the insert 120 in a forward direction, and the c-clip 144 abuts the annular rib 118 to limit the forward travel of the insert. A slight clearance between the annular rib 118 and insert 120 permits slight angular movement of the insert within the housing 102.

Referring to FIGS. 2 and 4, a male connector part 200 comprises a cable terminating part 210 and a panel-mount part 250. The cable terminating part 210 comprises a molded plastic cylindrical housing 212 having an axial bore 214. The housing 212 has an externally threaded section 216 at a forward end, and an internal annular rib 218.

The cable terminating part 210 further includes a cylindrical insert 220. This insert is identical to the insert 120 of the female connector part 100, and is mounted to a fiber optic cable 230 in the same manner as the insert 120 is mounted to the cable 130. The cable terminating part 210 also includes resilient biasing means in the form of a helical spring 240 which is identical to the spring 140 of the female connector part 100. The insert 220 and spring 240 are mounted in the housing 212 using c-clips 232 and 242 in the same manner as the insert 120 is mounted in the housing 102 of the female connector part 100.

The panel-mount part 250 comprises a male member in the form of a cylindrical moulded plastic housing 252 having an axial bore 254. The housing 252 has an internally threaded section 256 at a rearward end of the bore 254, and an internally projecting lip 258 at a forward end of the bore.

The housing 252 has a pair of diametrically opposed, axially extending, outwardly opening channels 260 carried on opposite sides 261 of the housing, each of which opens channels at a forward end of the housing. Each channel includes a latching formation in the form of a projection 262 which projects outwardly within its respective channel. Each projection 262 has a forwardly facing camming surface 264 which is inclined to the axial direction, and a rearwardly facing engaging surface 266 which is normal to the axial direction. The housing 252 also carries a lateral extension in the form of an external flange 270 having a pair of axially extending apertures 272, which may be used to secure the panel mount part 250 to a panel by means of screws or similar fasteners. The flange 270 carries a pair of stop formations, each comprising a pair of stop projections 274. Each pair of stop projections 274 is spaced apart along a respective side 261 of the housing 252, and all stop projections are equally laterally spaced from the housing 252.

The bore 254 of the housing 252 slidingly receives a sleeve 280 having conically tapered inner surfaces 282, and conically tapered outer surfaces 284 which permit the sleeve to rock slightly within the bore. The lip 258 limits the travel of the sleeve 280 within the bore 254 in a forward direction, and a threaded retaining ring 286 screwed into the internally threaded section 256 limits its travel within the bore in a rearward direction.

The cable terminating part 210 is assembled to the panel-mount part 250 to comprise the male connector part 200 by screwing the externally threaded section 216 of the housing 212 into the internally threaded section 256 of the housing 252. When this is done, the spring 240 urges the conically tapered forward section of the insert 220 against a conically tapered inner surface 282 of the sleeve 280, and urges the sleeve against the lip 258. The insert 220 and sleeve 280 together form a fiber holding means which holds and positively locates a fiber within the housings 212, 252 and which has an inner conical surface which is complementary to the outer conical surface of the insert 120. The housings 212, 252, when screwed together, define a male member for mating with the female member, housing 102, as described below.

The female connector part 100 is secured to the male connector part 200 by inserting the forward end of the panel-mount part housing 250 into the forward end of the female part chamber 106, with the ribs 108 of the female part entering the channels 260 of the male part. The channels 260 slidingly receive the ribs 108 to guide the male and female parts axially together.

Figure 5:
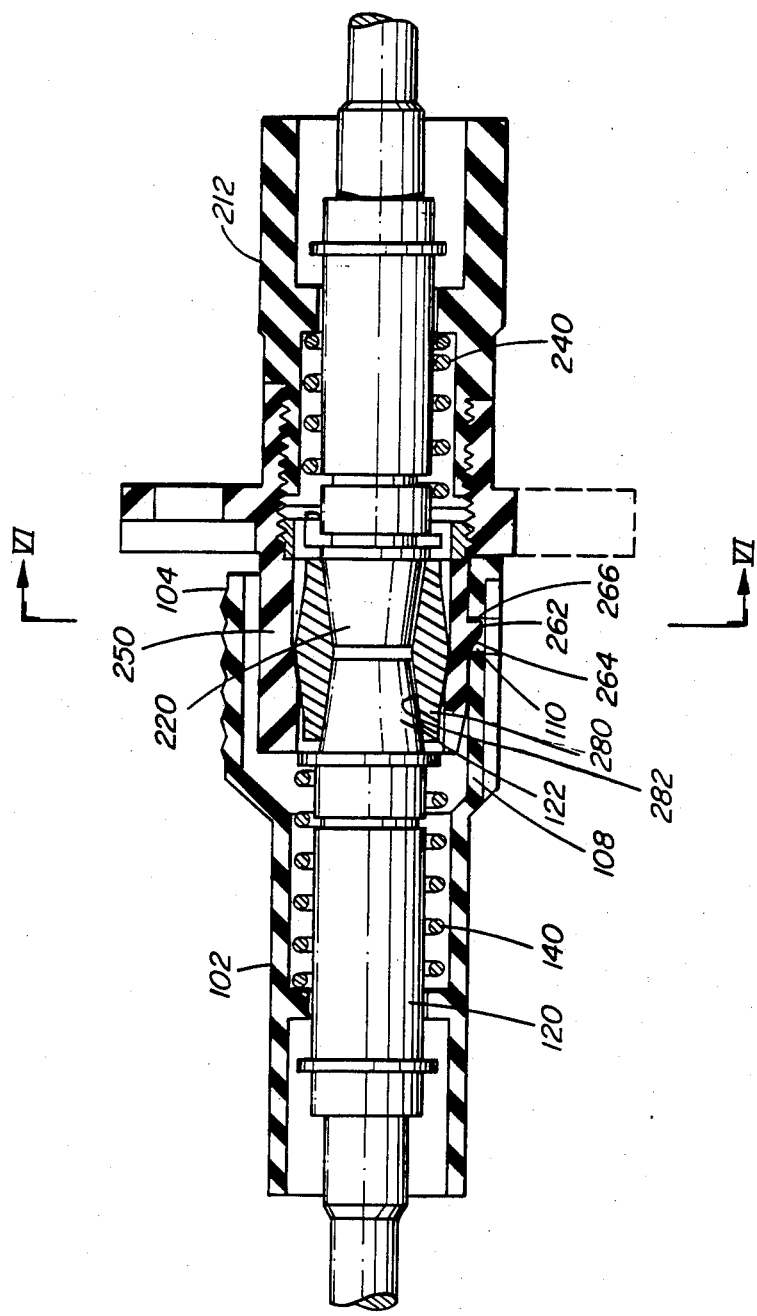
FIG. 5 is a side elevational view, partly in cross-section, of the male and female parts of FIGS. 1 and 2 mated together, the cross-section taken on section line V—V of FIG. 6.

As shown in FIG. 6, the panel-mount housing 250 is spaced inwardly of the wall 104 on the major axis of the oval cross-section of the wall. Consequently, when the ribs 108 encounter the camming faces 264 of the projections 262, the wall 104 deforms outwardly on its minor axis and inwardly on its major axis to permit the rib to pass over the projections, the projections snapping into the recesses 110 to latch the male and female parts together, as shown in FIGS. 5 and 6.

The wall portions 107 of the female connector part 100 fit between the sides 261 of the housing 252 and the stop projections 274 as shown in FIG. 6. Adequate clearance is provided between the sides 261 and stop projections 274 to permit deformation of the wall 104 as is required for latching and unlatching operations.

Note that, as the ribs 108 are moved along the channels 260, the conically tapered section 122 of the insert 120 encounters a complementary conically tapered inner surface 282 of the sleeve 280. The conically tapered inner surface 282 guides the insert 120 into alignment with the insert 220 of the male part, thereby accurately aligning the optical fibers secured in the male and female parts. Lateral clearance is provided around one or both of the inserts 120, 220 to permit slight lateral and angular movement of the inserts within their respective housings 102, 212 under the aligning influence of the sleeve 280.

Further movement of the ribs 108 along the channels 260 compresses the springs 140, 240. When the male and female parts are latched together, the spring 140 operates between the housing 102 and the insert 120 to urge the insert 120 axially toward the insert 220 and against the sleeve 280 and to urge the housings axially apart to a stop position in which the engaging surfaces 266 of the projections 262 axially abut against forward edges 111 of the recesses 110. The spring 240 also acts to urge the inserts 120, 220 and sleeve 280 together and to urge the housings apart into the stop position. Consequently, relative axial movement of the optical fibers and of the male and female connector parts, and consequent variation in optical insertion loss at the connection are reduced.

To unlatch the male and female connector parts, the female part housing 102 is manually squeezed at the gripping surfaces 112 to deform the wall 104 inward on its major axis and outward on its minor axis, thereby disengaging the recesses 110 from the projections 262. The female part may then be pulled axially from the male part.

The stop projections 274 limit lateral movement of the wall portions 261 when the female part housing is squeezed to ensure that the female part housing remains centered on the male part housing 252. If the lateral movement of one wall portion is greater than the lateral movement of the other, a respective pair of stop projections will inhibit further lateral movement of that wall portion so that further deformation of the wall will cause the other wall portion to move outward toward its respective pair of stop formations. This centering action ensures that both latching recesses 110 disengage from their respective latching projections 262, and that the female part may be pulled axially from the male part.

The sleeve 280 could be made integral with either of the inserts 120, 220 and the conical surfaces of the inserts and sleeve could be replaced by any complementary surfaces which mate to align the fibers, converging surface regions being preferred.

What is claimed is:

1. An optical fiber connector, comprising:
a female member having a continuous wall defining a chamber open at one end of the female member, the wall having a first wall portion which carries a first latching formation and a second wall portion opposite the first wall portion, the first latching formation being accessible from within the chamber, and the wall being resiliently deformable such that inward deformation of the wall at opposed locations spaced angularly in opposite directions from the first latching formation causes outward deformation of the wall at the first latching formation to move the first latching formation outwardly;
a male member for assembly to the female member by insertion axially into the open end of the chamber, the male member having a first side which carries a second latching formation, a second side opposite the first side, and a lateral extension carrying a stop formation spaced laterally of the second side, said second latching formation provided on the male member for engagement with the first latching formation to latch the male member to the female member, the male member being spaced inwardly of the wall at said opposed locations when latched within the chamber to permit inward deformation of the wall at said locations sufficient to disengage the first latching formation from the second latching formation by outward movement of the first latching formation, the first wall portion of the female member being adjacent to the first side of the male member and the second wall portion of the female member fitting between the second side of the male member and the stop formation when the male member is fitted to the female member, and the stop formation limiting lateral movement of the second wall portion upon inward deformation of the wall at said opposed locations so that further inward deformation of the wall at said opposed locations forces the first wall portion away from the first side to disengage the first latching formation from the second latching formation; and
a first fiber holding means of the connector within the female member for holding an end portion of a first optical fiber to extend axially along the female member, and a second fiber holding means of the connector within the male member for holding an end portion of a second optical fiber to extend axially along the male member such that assembly of the male member to the female member axially aligns the first and second optical fibers.

2. An optical fiber connector as defined in claim 1, wherein:
at least one of the fiber holding means is axially movably mounted to its respective member; and
the connector further comprises resilient biasing means operable between said one of the fiber holding means and its respective member when the members are latched together to urge the first and second fiber holding means axially together and to urge the male and female members axially apart to a stop position at which the latching formations abut axially together.

3. A connector as defined in claim 1, wherein one of the latching formations comprises a projection and the other of the latching formations comprises a recess for receiving the projection to latch the male member to the female member.

4. A connector as defined in claim 3, wherein the projection has an inclined camming surface which faces forwardly as the male member is inserted into the female member for camming the wall outwardly upon insertion to permit movement of the male member along the chamber until the projection enters the recess, and a rearwardly facing engaging surface for engaging an edge of the recess when the projection is in the recess to prevent withdrawal of the male member from the chamber.

5. A connector as defined in claim 3, wherein the wall has a rib extending axially of the female member and projecting inwardly into the chamber, the first latching formation is a recess in said rib opening inwardly into the chamber, the male member has an axially extending, outwardly opening channel for slidably receiving the rib to guide the male member in an axial direction when the male member is inserted into the chamber, and the second latching formation is a projection within the channel.

6. A connector as defined in claim 1, wherein the wall has two opposed first latching formations and the male member has two opposed second latching formations, each engageable with a respective one of the first latching formations to latch the male member to the female member, and each movable outwardly by inward deformation of the wall at said locations to disengage the first latching formations from the second latching formations.

7. A connector as defined in claim 6, wherein the wall, when undeformed, is generally oval in a section normal to a longitudinal axis of the female member with said first latching formations being on a minor axis of the wall and said locations being on major axis of the wall.

8. A connector as defined in claim 2, wherein the fiber holding means have complementary surfaces which mate to guide the fiber holding means into axial alignment when the fiber holding means are urged axially together.

9. A connector as defined in claim 8, wherein one of the fiber holding means comprises an axially extending sleeve for receiving the other of the fiber holding means, said sleeve having converging inner surface regions complementary to converging outer surface regions of the other of the fiber holding means.

10. A connector as defined in claim 9, wherein the converging surface regions are conical.

11. A connector as defined in claim 1, wherein:

each of the first and second wall portions carries a respective first latching formation;

each of the first and second sides carries a respective second latching formation;

the lateral extension carries first and second stop formations spaced laterally of the first and second sides respectively;

each wall portion fits between a respective side and stop formation when the male member is fitted to the female member; and each stop formation limits lateral movement of a respective wall portion upon inward deformation of the wall at said opposed locations to force the other wall portion laterally against its respective stop formation, adequate clearance being provided between each side and its respective stop formation to permit disengagement of a respective first latching formation from a respective second latching formation.

12. A connector as defined in claim 11, wherein each stop formation comprises a pair of stop projections, all stop projections being equally laterally spaced from the male member and each pair of projections being spaced apart along a respective side of the male member.

* * * * *